(12) United States Patent
Aoki

(10) Patent No.: US 11,128,040 B2
(45) Date of Patent: Sep. 21, 2021

(54) METHOD AND APPARATUS FOR RECEIVING SIGNAL IN MOBILE COMMUNICATION SYSTEM

(71) Applicant: Samsung Electronics Co., Ltd., Suwon-si (KR)

(72) Inventor: Yuichi Aoki, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 556 days.

(21) Appl. No.: 15/523,662

(22) PCT Filed: Nov. 6, 2015

(86) PCT No.: PCT/KR2015/011904
§ 371 (c)(1),
(2) Date: May 1, 2017

(87) PCT Pub. No.: WO2016/080868
PCT Pub. Date: May 26, 2016

(65) Prior Publication Data
US 2017/0373391 A1   Dec. 28, 2017

(30) Foreign Application Priority Data

Nov. 19, 2014 (KR) ........................ 10-2014-0161920

(51) Int. Cl.
*H01Q 3/26* (2006.01)
*H04B 1/10* (2006.01)
(Continued)

(52) U.S. Cl.
CPC ............ *H01Q 3/2605* (2013.01); *H04B 1/10* (2013.01); *H04B 1/109* (2013.01); *H04B 7/0465* (2013.01);
(Continued)

(58) Field of Classification Search
CPC . H04B 1/10; H04B 1/109; H04B 7/02; H04B 7/0465; H01Q 3/2605; H04W 72/12
See application file for complete search history.

(56) References Cited

U.S. PATENT DOCUMENTS 5,134,490 A * 7/1992 Neal .................. H04N 5/59
348/687
8,416,659 B1 * 4/2013 Xie .................. G11B 20/10037
369/47.17
(Continued)

FOREIGN PATENT DOCUMENTS

WO     2010/101433 A2    9/2010
WO     2013-009283 A1    1/2013

OTHER PUBLICATIONS

Office Action dated May 25, 2020 in connection with Korean Patent Application No. 10-2014-0161920, 10 pages.

*Primary Examiner* — Dao L Phan

(57) ABSTRACT

The present disclosure relates to a 5G or pre-5G communication system to be provided to support a higher data transmission rate after a 4G communication system such as LTE. An embodiment of the present specification relates to beamforming in a mobile communication system and comprises a step for configuring an operation of a limiter circuit for adjusting amplitude of a signal received by a receiver, and receiving the signal according the configuration. According to various embodiments of the present specification, a limiter circuit employed in a receiver supporting beamforming can prevent a reception circuit from being damaged. Further, when reception antenna gain is low or a high signal-to-noise ratio is required, a received signal is not allowed to pass through the limiter circuit so that the received signal can be prevented from deteriorating.

21 Claims, 9 Drawing Sheets

(51) Int. Cl.
*H04B 7/0456* (2017.01)
*H04W 52/42* (2009.01)
*H04B 7/08* (2006.01)
*H04B 7/06* (2006.01)

(52) U.S. Cl.
CPC ............ *H04B 7/0617* (2013.01); *H04B 7/088* (2013.01); *H04W 52/42* (2013.01)

(56) References Cited

U.S. PATENT DOCUMENTS

| | | |
|---|---|---|
| 8,749,430 B2 | 6/2014 | Shinonaga et al. |
| 2002/0054621 A1* | 5/2002 | Kyeong ............... H04B 7/0897 375/147 |
| 2004/0136395 A1* | 7/2004 | Itahara ................ H04L 27/2614 370/441 |
| 2005/0130606 A1 | 6/2005 | Wang et al. |
| 2013/0010849 A1 | 1/2013 | Shimizu et al. |
| 2014/0010124 A1 | 1/2014 | Kumamoto et al. |
| 2014/0119281 A1 | 5/2014 | Kummetz et al. |
| 2014/0194293 A1 | 7/2014 | Kumamoto et al. |

\* cited by examiner

FIG. 3

| CCH | SS/BCH | BMS | DCH | DCH | DCH | DCH | DCH | DCH |

METHOD AND APPARATUS FOR RECEIVING SIGNAL IN MOBILE COMMUNICATION SYSTEM

CROSS-REFERENCE TO RELATED APPLICATION(S)

The present application claims priority under 35 U.S.C. § 365 to International Patent Application No. PCT/KR2015/011904 filed Nov. 6, 2015, entitled "METHOD AND APPARATUS FOR RECEIVING SIGNAL IN MOBILE COMMUNICATION SYSTEM", and, through International Patent Application No. PCT/KR2015/011904, to Korean Patent Application No. 10-2014-0161920 filed Nov. 19, 2014, each of which are incorporated herein by reference into the present disclosure as if fully set forth herein.

TECHNICAL FIELD

The present invention relates to beamforming in a mobile communication system. In particular, the present invention relates to a signal reception method and apparatus of a terminal supporting the beamforming.

BACKGROUND ART

In order to meet the increasing demand for wireless data traffic since the commercialization of 4G communication systems, the development focus is on the 5$^{th}$ Generation (5G) or pre-5G communication system. For this reason, the 5G or pre-5G communication system is called a beyond 4G network communication system or post Long Term Evolution (LTE) system.

Consideration is being given to implementing the 5G communication system in millimeter wave (mmWave) frequency bands (e.g., 60 GHz bands) to accomplish higher data rates. In order to increase the propagation distance by mitigating propagation loss in the 5G communication system, discussions are underway about various techniques such as beamforming, massive MIMO, Full Dimensional MIMO (FD-MIMO), array antenna, analog beamforming, and large scale antenna.

Also, in order to enhance network performance of the 5G communication system, developments are underway of various techniques such as evolved small cell, advanced small cell, cloud Radio Access Network (cloud RAN), ultra-dense network, Device to Device (D2D) communication, wireless backhaul, moving network, cooperative communication, Coordinated Multi-Points (CoMP), and interference cancellation.

Furthermore, the ongoing research includes the use of Hybrid FSK and QAM Modulation (FQAM) and Sliding Window Superposition Coding (SWSC) as Advanced Coding Modulation (ACM), Filter Bank Multi Carrier (FBMC), Non-Orthogonal Multiple Access (NOMA), and Sparse Code Multiple Access (SCMA).

The next generation (5G) network communication system requires a high spectrum efficiency and high data rate in comparison with the legacy (4G) communication system. Spatial Multiplexing can be one of the solutions for achieving a high spectrum efficiency. Meanwhile, despite high propagation loss over the bandwidth, a millimeter-wave broadband communication may also be one of the solutions to achieve a high data rate Beamforming is a key technology for achieving spatial multiplexing and overcoming propagation loss. Typically, if the number of antennas is doubled, antenna gain is doubled and the coverage angle is halved at the same power level. This means a doubled coverage at the same power (or same coverage at the halved power) and doubled spatial multiplexing. For this reason, the use of beamforming is discussed in all internal 5G communication development groups.

In a cellular radio communication system supporting a beamforming technology, a beam search is performed at a higher power level to cover a wide area and achieve high reception gain. Even when the base station (transmitter) and the terminal (receiver) are located close to each other, the beam search has to be performed in such a way because the distance therebetween is not known to them. In the case of using a narrow beam for achieving a high antenna gain, if beam mismatch occurs between the transmitter and the receiver, the received signal is likely to be weak. However, if multiple signals are combined at the receiver so as to realize beam matching at a close distance, the received signal power may increase to an extent of damaging the circuit. That is, the terminal does not know the distance from the base station, and the base station does not know the received signal level at the terminal when the beam matching is achieved. Also, since the terminal performs beam search in such a way as to maximize the antenna gain to cover a range as large as possible, if the base station is close to the terminal (e.g., within a range of about 10 meters), a very strong signal may damage the internal circuit of the terminal.

FIG. 1 is a diagram illustrating a beam mismatch situation and a beam match situation incurring reception circuit damage between a transmitter (base station (BS)) and a receiver (mobile station (MS)). In order to protect against potential damage of the signal reception circuit as shown in the lower part of FIG. 1, use of a limiter circuit may be considered. The limiter circuit may limit the input to a predetermined level to prevent subsequent circuits from facing power of an extent to cause damage. However, the limiter circuit may cause signal quality degradation. In detail, the limiter circuit limits the amplitude of a signal to a predetermined level and thus results in SNR loss and distortion of the signal. That is, the limiter circuit distorts the signal and degrades signal quality in terms of Signal-to-Noise Ratio (SNR) and Bit-Error Rate (BER).

DISCLOSURE OF INVENTION

Technical Problem

The present invention has been conceived to solve the above problems and aims to provide a signal reception method and apparatus of a receiver which supports beamforming and has a limiter circuit.

Solution to Problem

In accordance with an aspect of the present invention, a signal reception method of a receiver supporting beamforming in a mobile communication system includes configuring an operation of a limiter according to at least one of a type of a signal to be received, a beam direction of the receiver, and a condition on whether an antenna gain is optimized and receiving the signal according to the configuration.

In accordance with another aspect of the present invention, a receiver supporting beamforming in a mobile communication system includes at least two antennas for receiving a signal transmitted by a transmitter and a controller which configures an operation of a limiter according to at least one of a type of a signal to be received, a beam direction of the receiver, and a condition on whether an antenna gain is optimized and controls the receiver to receive the signal according to the configuration.

In accordance with still another aspect of the present invention, a receiver supporting beamforming in a mobile communication system includes at least two antennas for receiving signals transmitted by a transmitter, a combiner which combines the signals received through the at least two antennas, and a limiter which adjusts an amplitude of a combined signal output from the combiner.

Advantageous Effects of Invention

The signal reception method and apparatus of the present invention is advantageous in terms of protection against potential damage to a signal reception circuit by use of a limiter in a receiver supporting beam forming.

Also, the signal reception method and apparatus of the present invention is advantageous in terms of protecting against potential received signal quality degradation by allowing the received signal to bypass the limiter circuit when the receive antenna gain is low or a high SNR is required.

BRIEF DESCRIPTION OF DRAWINGS

FIG. 3 is a diagram illustrating a structure of a radio frame carrying various types of signals in a radio communication system;

MODE FOR THE INVENTION

Figure 1:
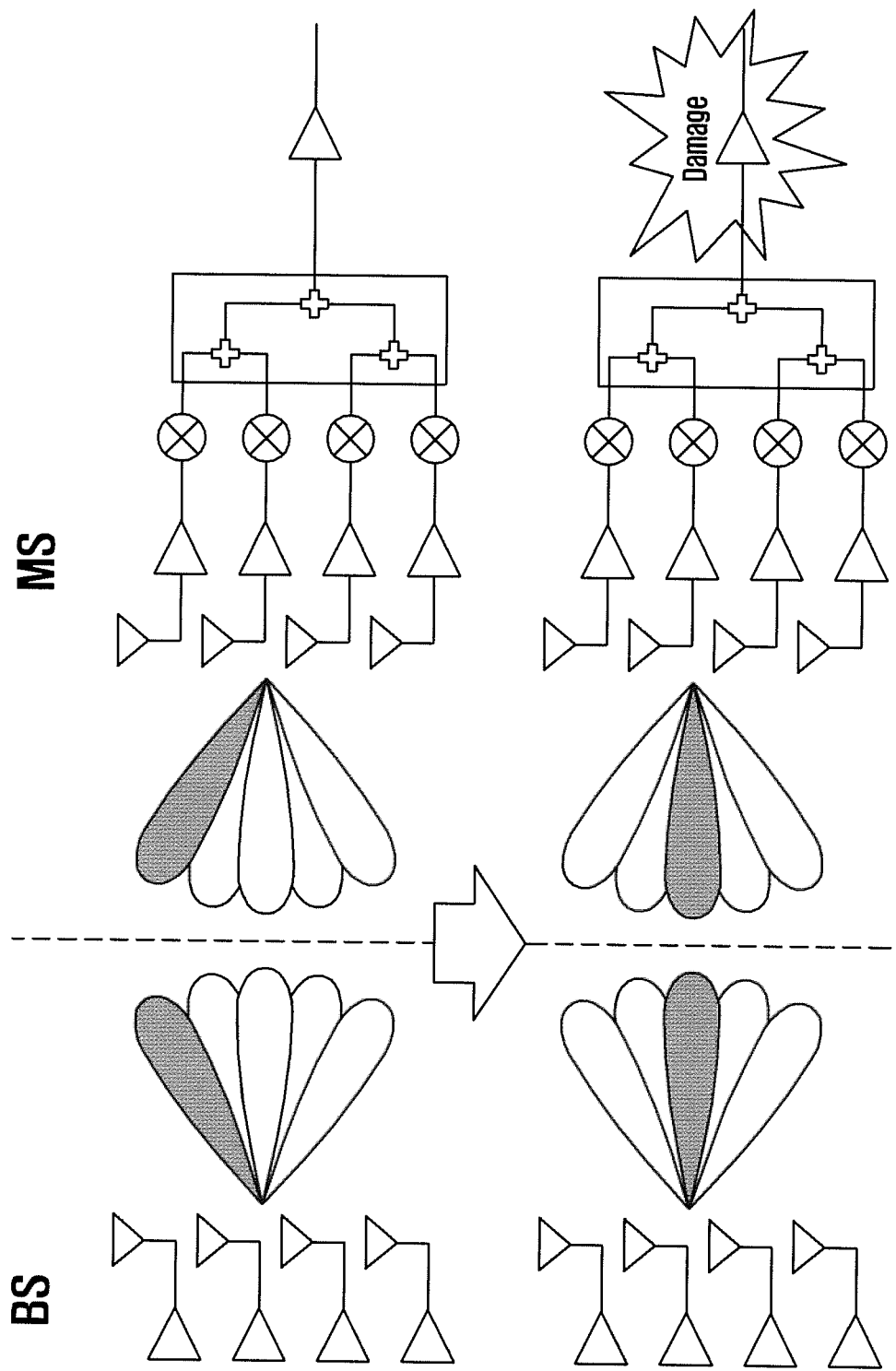
FIG. 1 is a diagram illustrating a beam mismatch situation and a beam match situation incurring reception circuit damage between a transmitter (base station (BS)) and a receiver (mobile station (MS))

Exemplary embodiments of the present invention are described in detail with reference to the accompanying drawings.

Detailed descriptions of well-known functions and structures incorporated herein may be omitted to avoid obscuring the subject matter of the present invention. This aims to omit unnecessary description so as to make the subject matter of the present invention clear.

For the same reason, some elements are exaggerated, omitted, or simplified in the drawings and, in practice, the elements may have sizes and/or shapes different from those shown in the drawings. The same reference numbers are used throughout the drawings to refer to the same or like parts.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus to produce a machine, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce manufacture articles embedding instruction means which implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time or may be performed in reverse order according to their functions.

According to various embodiments of the present disclosure, the term "module", means, but is not limited to, a software or hardware component, such as a Field Programmable Gate Array (FPGA) or Application Specific Integrated Circuit (ASIC), that performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

In the present invention, the transmitter is a device transmitting beamformed signals to a receiver and may be interchangeably referred to as "base station (BS)", "transmit part", "transmission device", or "transmission terminal".

In the present invention, the receiver is a device receiving beamformed signals transmitted by a transmitter and may be interchangeably referred to as "mobile station (MS)", "User Equipment (UE)", "mobile terminal", "reception device", "reception terminal", or "terminal".

In the present invention, beamforming is a technique for arranging a plurality of antenna elements in a specific pattern and multiplying outputs of the antenna elements by weightings to form an antenna beam directed to a terminal such that the receiver can extract a desired signal from the interfered signal.

It is possible to acquire higher power at the transmitter and receiver at the same transmit power level by giving a large gain in a direction of a signal to be beamformed and a small gain in other directions. That is, it may be possible to form a beam to achieve constructive interference for the target subscriber and descriptive interference for other subscribers.

The embodiments of the present invention are described in detail hereinafter with reference to the accompanying drawings.

Figure 2:
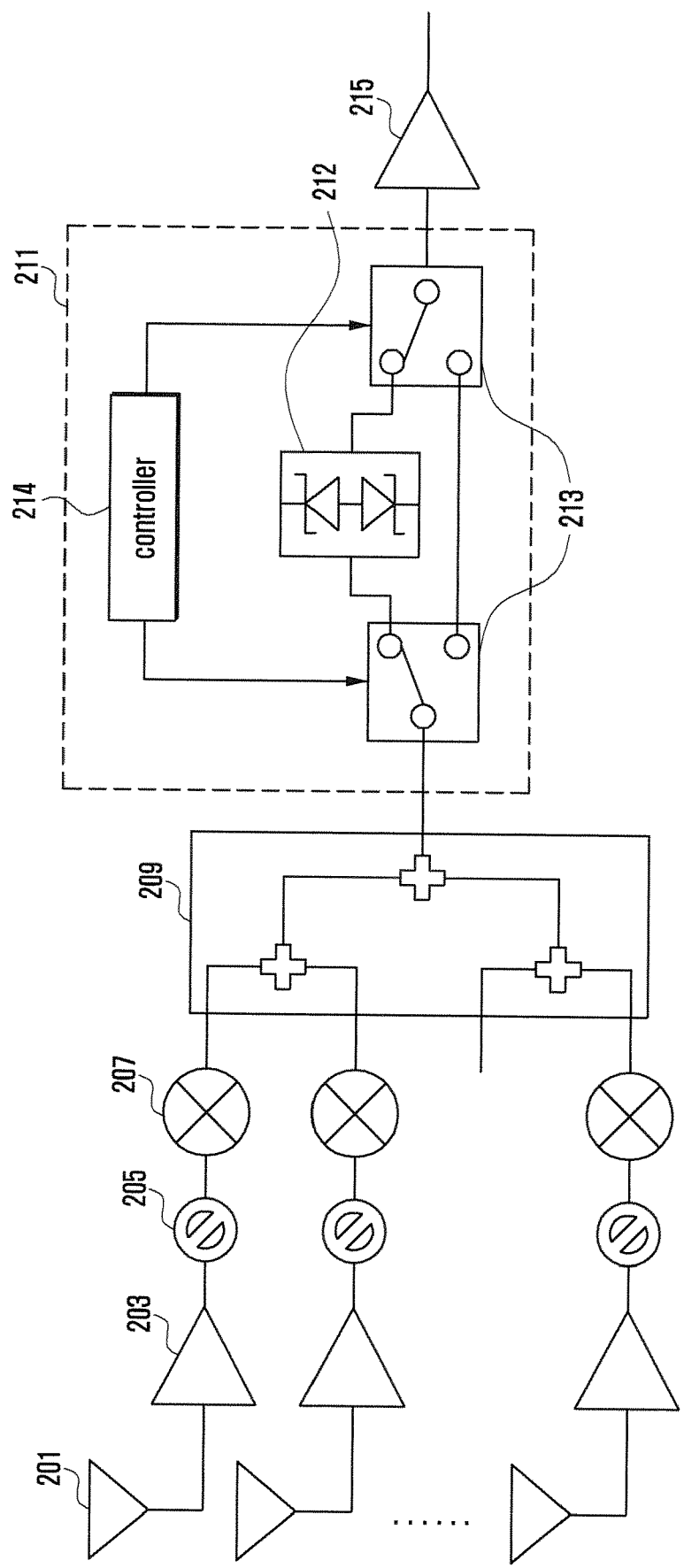
FIG. 2 is a circuit diagram illustrating a configuration of a receiver according to an embodiment of the present invention.

FIG. 2 is a circuit diagram illustrating a configuration of a receiver according to an embodiment of the present invention.

In reference to FIG. 2, the receiver of the present invention includes a plurality of antenna elements 201, a plurality of low-noise amplifiers 203, a plurality of phase shifters 205, a plurality of mixers 207, a combiner 209, a limiter 211, and an amplifier 215. Although FIG. 2 shows only the components necessary for explaining the present invention, the receiver may further include other components in charge of various functions. The components depicted in FIG. 2 may be differently connected to each other in various embodiments. Detailed descriptions thereof are made hereinafter with reference to FIGS. 7 to 9.

The antenna elements 201 receive signals transmitted by a transmitter. The receiver of the present invention may include at least one antenna element 201, and each antenna element 201 may receive the same signal arriving with different delays. In the case that a communication system uses 16 antenna elements to perform beamforming for 4 MIMO streams, the total number of required antennas is 64.

The low-noise amplifiers 203 suppress noise in the received signals to improve the signal-to-noise ratio (SNR). Examples of the low-noise amplifiers 203 include, but are not limited to, pyramid amplifiers, low-noise transistor amplifiers, major amplifiers, room-temperature parametric amplifiers, and GaAs Field Effect Transistor (FETs).

Each phase shifter 205 may shift the phase of a received signal by a predetermined value to combine or split multiple signals at each antenna element 201.

Each mixer 207 may output a signal with a frequency by mixing two or more input signals with different frequencies. The mixer 207 may up-convert or down-convert the input signal in frequency.

The combiner 209 may combine the signals received through the multiple antenna elements 201. The combined signal may be weak or strong according to the distance between the transmitter and the receiver and whether beam matching is achieved. In the present invention, the received signal may be controlled by means of the limiter 211 to protect against reception circuit damage occurring when the beam matching is accomplished between the transmitter and the receiver located close to each other.

The limiter 211 may include a limiter circuit 212, switches 213, and a controller 214 for controlling them.

The limiter circuit 212 may cut off an upper or lower part of a waveform of the input signal to limit the amplitude. The limiter circuit 212 may be referred to as a limiter, a limiter circuit, or a slice circuit and typically implemented with a diode device, but the present invention is not limited by the device implementing the limiter circuit 212.

The limiter 211 may include multiple switches 213 and be designed in various manners according to the number of the switches 213. The switches 123 may operate to provide connection or disconnection to the limiter circuit 212 under the control of the controller 214.

The controller 214 may control the switches 213 such that the signal output from the combiner 209 passes or bypasses the limiter circuit 212. The controller 214 may control the switches 213 according to the frame scheduling of the received signal or the setting value of antenna gain. According to various embodiments of the present invention, the controller 214 may be a modem.

The amplifier 215 may amplify the signal passed through the limiter with an arbitrary gain.

A description in detail is made hereinafter of the operation of the receiver of FIG. 2 in line with the signal flow.

The signal output from the combiner 209 may be input to the limiter 211. That is, the output signal of the combiner 209 may become the input signal of the first switch 213, and the first signal may be output to the limiter 212 or the second switch 213 under the control of the controller 214.

The limiter circuit 212 may adjust the amplitude of the signal output from the first switch. The signal output from the limiter circuit 212 is input to the second switch, which outputs the signal to the amplifier 215.

The controller 214 may control such that the signal output from the combiner 209 bypasses the limiter circuit 212 and is transmitted to the second switch without change in amplitude.

Figure 3:
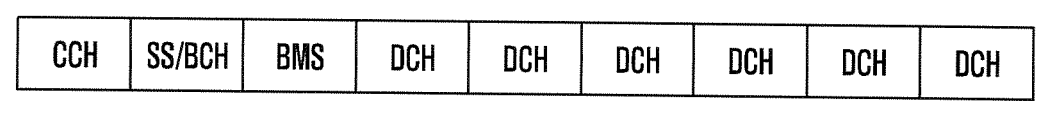

FIG. 3 is a diagram illustrating a structure of a radio frame carrying various types of signals in a radio communication system.

The receiver of the present invention may receive a signal carrying a plurality of logical channels as shown in FIG. 3 from a transmitter. The signal transmitted from the transmitter and the receiver may include a Synchronization Signal (SS), a Broadcasting Channel (BCH), a Control Channel (CCH), a Beam Measurement Slot (BMS), and a Data Channel (DCH).

The SS provides frame timing information. The receiver receives the SS to achieve frame synchronization with the cell serving the receiver. That is, the receiver acquires the start time of the downlink frame.

The BCH provides the receiver with basic system information. The transmitter may broadcast a Master Information Block (MIB) through the BCH, and the receiver may receive System Information Blocks (SIBS) based on the information acquired from the MIB. The receiver may check the frame format for receiving signals based on the system information received through the BCH or based on the information stored in its storage.

The CCH may provide the receiver with the information on data transmission scheduling on a DCH.

The BMS is a duration for optimizing the beam direction.

The beamforming receiver of the present invention receives data as follows. First, the receiver searches for the SS to obtain the radio framing timing. Second, the receiver optimizes the beam direction during the BMS in negotiation with the transmitter. Third, the receiver optimizes the gain of the amplifier which amplifies the signal received by the antennas. Finally, the receiver receives data according to the configuration made for optimization of the beam direction or the gain.

Here, the SS, BCH, and BMS are commonly used in both a close distance situation characterized by a high SNR and a far distance situation characterized by a low SNR. This means that the SS, BCH, and BMS do not require a high SNR. That is, the receiver can receive the SS, BCH, and BMS regardless of the SNR. In contrast, the DCH requires a high SNR in the close distance situation. This means that the signal quality degradation problem caused by the limiter circuit arises when the receiver receives the DCH in the close distance situation. In the case of receiving the DCH from a close distance, the gain of the receiver is low. This is because the DCH reception is performed after receiver gain optimization. Typically, the signal amplified in a situation with a low receiver gain is not strong and thus no limiter circuit is necessary.

The present invention proposes a method and apparatus for control switches connected to the limiter circuit in consideration of the above described characteristics.

Figure 4:
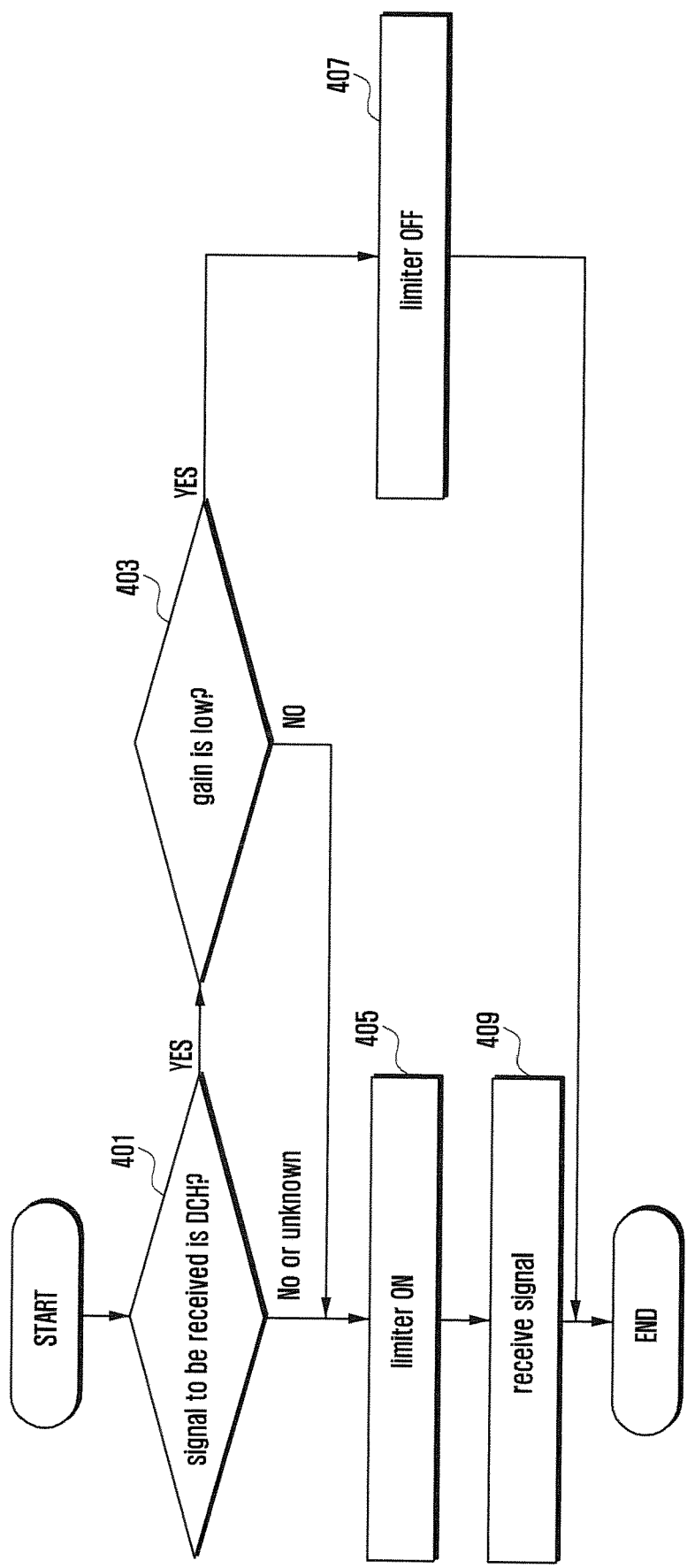
FIG. 4 is a flowchart illustrating a signal reception method of a receiver according to an embodiment of the present invention.

FIG. 4 is a flowchart illustrating a signal reception method of a receiver according to an embodiment of the present invention.

In reference to FIG. 4, the receiver determines at step 401 whether a signal to be received is a DCH. The receiver may determine whether the next signal to be received is a DCH based on the system information carried in the BCH that precedes the DCH.

If it is determined that the signal to be received is unknown or not the DCH, the receiver sets the limiter circuit to ON at step 405. In detail, if the signal to be received is not the DCH, this means that no high SNR is required; thus, there is no need for limiting the amplitude of the signal and, in this case, the receiver can protect against potential damage by setting the limiter circuit to ON. If it is determined that the signal to be received is unknown, this means that the SS and BCH are not received yet; thus, the receiver assumes that it is a stage for performing a beam search. Accordingly, it is preferable that the receiver that is receiving a beamed signal with a high gain sets the limiter circuit to ON.

If it is determined at step 401 that the signal to be received is the DCH, the receiver may determine at step 403 whether the gain determined through optimization is low. The determination on the condition of whether the determined gain is low may be made in such a way of determining whether the gain is less than a threshold value stored in the receiver.

If it is determined that the determined gain is not low, the receiver may set the limiter circuit to ON at step 405 because the signal passing the amplifier set with the corresponding gain may damage the receiver circuit when the transmitter and the receiver are close to each other. The limiter cuts off the amplitude of the signal to configure for protection against potential damage of the receiver circuit.

Otherwise, if it is determined at step 403 that the determined gain of the receiver is less than the threshold value, this means that there is no risk of damage to the receiver circuit; thus, the receiver sets the limiter circuit to OFF at step 407 to prevent the amplitude cut-off of the received signal from degrading the received signal quality.

After the limiter circuit is set at step 405 or 407, the receiver may receive the signal at step 409.

Figure 5:
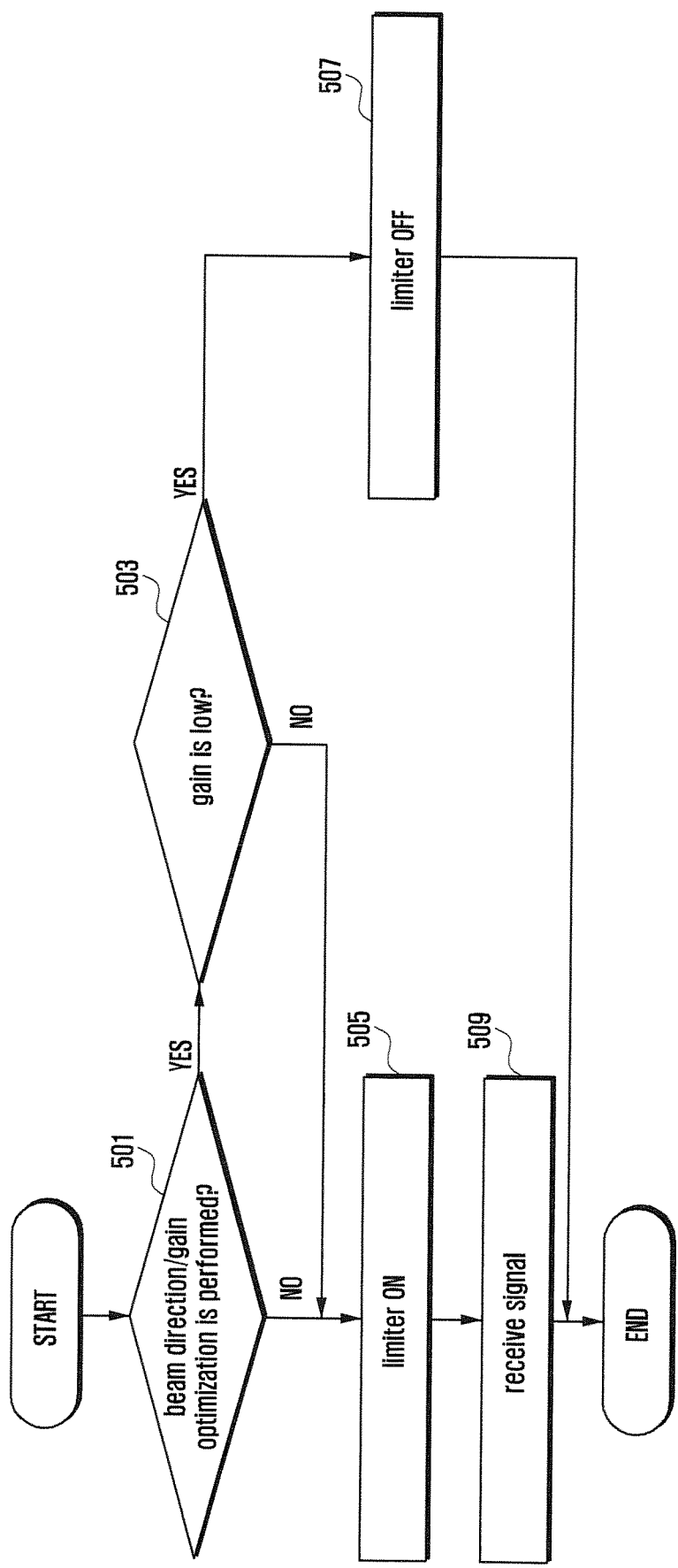
FIG. 5 is a flowchart illustrating a signal reception method of a receiver according to another embodiment of the present invention.

FIG. 5 is a flowchart illustrating a signal reception method of a receiver according to another embodiment of the present invention.

The embodiment of FIG. 5 differs from the embodiment of FIG. 4 in that a determination is made on whether a beam direction or gain optimization has been completed rather than whether the signal to be received by the receiver is a DCH.

In the case that there is a long distance between the transmitter and the receiver in a radio communication system supporting beamforming, the strength of the signal arriving at the receiver is weak; thus, the receiver cannot use a limiter circuit or, if using a limiter circuit, it is necessary to set the limiter circuit to OFF. This is because the receiver may face a risk of damage caused by a beam-matched signal from a transmitter located close thereto.

The embodiment of FIG. 5 is directed to a method for operating the limiter circuit regardless of the condition of whether the signal to be received is a DCH. That is, the receiver may determine at step 501 whether the beam direction or gain optimization has been completed. The receiver performs beam direction or gain optimization based on the channel state between the receiver and the transmitter and receives signals in the determined beam direction with the determined gain. Accordingly, if the receiver receives a beam-matched signal from a transmitter located close thereto, its reception circuit is likely to be damaged. In various embodiments, the receiver may determine whether the beam direction and gain is determined based on the condition of whether system information has been received through the BCH.

If it is determined that the beam direction or gain has not been optimized, this means that neither SS nor BCH has been received yet and the receiver assumes that it is a stage for performing beam search. This means that the receiver is receiving the beamed signal with a high gain, and the receiver may set the limiter circuit to ON at step 505.

Otherwise if it is determined at step 501 that the beam direction or gain has been optimized, the receiver may determine at step 503 whether the determined gain is low. The determination on the condition of whether the determined gain is low may be made in such a way of determining whether the gain is less than a threshold value stored in the receiver.

If it is determined that the optimized gain is equal to or greater than a predetermined threshold value, this means that the transmitter and the receiver are located too close and there may be damage to the receiver circuit. In this case, the receiver may set the limiter circuit to ON at step 505.

If it is determined at step 503 that the determined gain is less than the predetermined threshold value, this means that there is no risk of damaging the receiver circuit; thus, the receiver may set the limiter circuit to OFF at step 507 to prevent the amplitude cut-off of the received signal from degrading the received signal quality.

After the limiter circuit is set at step 505 or 507, the receiver may receive the signal at step 509.

Figure 6:
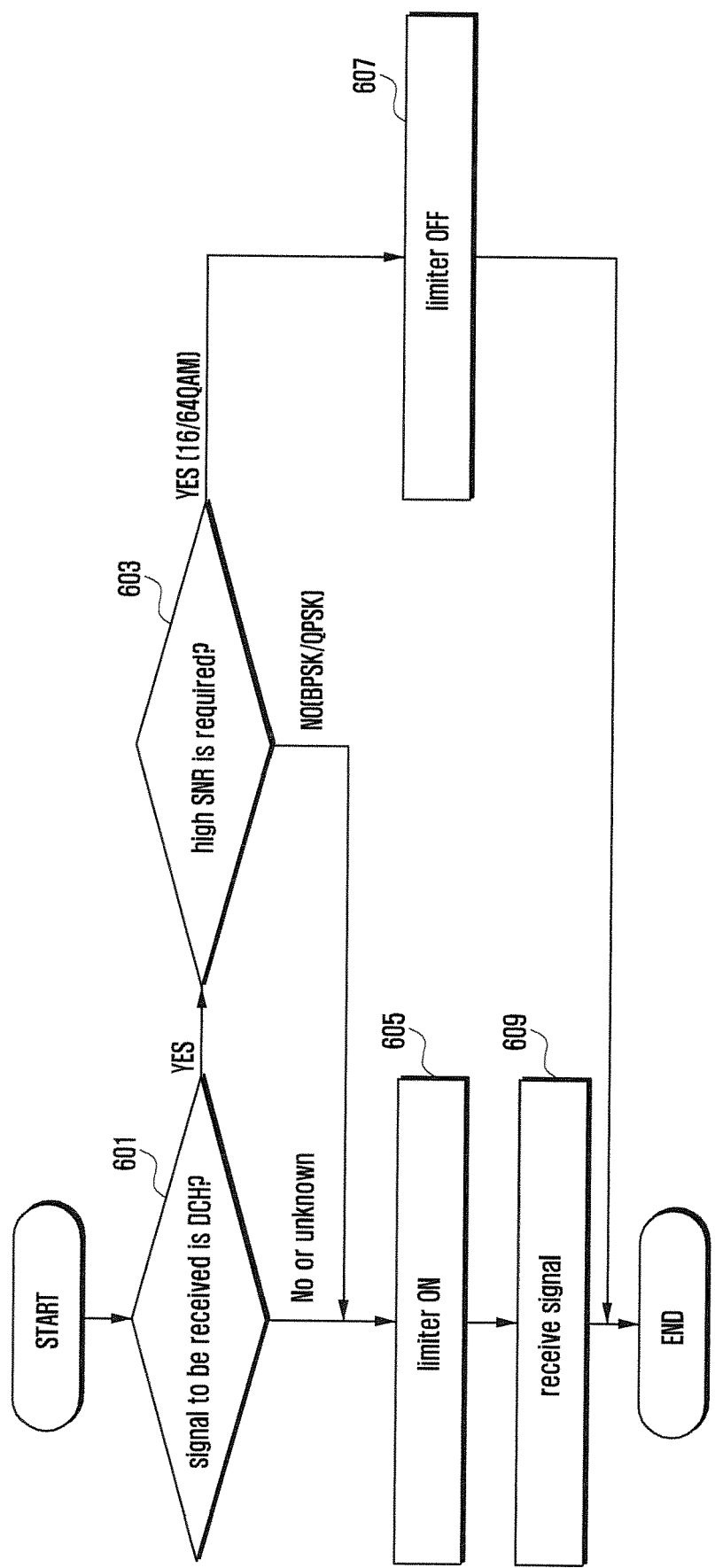
FIG. 6 is a flowchart illustrating a signal reception method of a receiver according to still another embodiment of the present invention.

FIG. 6 is a flowchart illustrating a signal reception method of a receiver according to still another embodiment of the present invention.

In the embodiment of FIG. 6, the limiter circuit is controlled based on the condition of whether a high SNR is required for the signal to be received rather than whether the preset gain is high or low.

In detail, the receiver may determine at step 601 whether the signal to be received is a DCH. This determination can be made based on the MIB received through the BCH. If it is determined that the signal to be received is unknown or not the DCH, the receiver sets the limiter circuit to ON at step 605. In detail, if the signal to be received is not the DCH, this means that no high SNR is required; thus, there is no need for limiting the amplitude of the signal and, in this case, the receiver can protect against potential damage by setting the limiter circuit to ON. If it is determined that the signal to be received is unknown, this means that the SS and BCH are not received yet; thus, the receiver assumes that it is a stage for performing beam search. Accordingly, it is preferable that the receiver which is receiving a beamed signal with a high gain sets the limiter circuit to ON.

If it is determined at step 601 that the signal to be received is the DCH, the receiver may determine at step 603 whether a high SNR is required for the corresponding DCH. That is, if it is determined that the signal to be received is a DCH, the receiver determines at step 603 whether the SNR of the DCH to be received should be high and turns on the limiter circuit depending on the determination result. In the embodiment of FIG. 6, the limiter circuit may be configured according to the modulation/demodulation scheme on the DCH to be received. If the DCH is modulated with binary phase shift keying (BPSK) or quadrature phase shift keying (QPSK), the receiver sets the limiter circuit to ON at step 605; otherwise, if the DCH is modulated with the 16 Quadrature Amplitude Modulation (QAM) or 64 QAM, the receiver sets the limiter circuit to OFF at step 607.

After the limiter circuit is set at step 605 or 607, the receiver may receive the signal at step 609.

Figure 7:
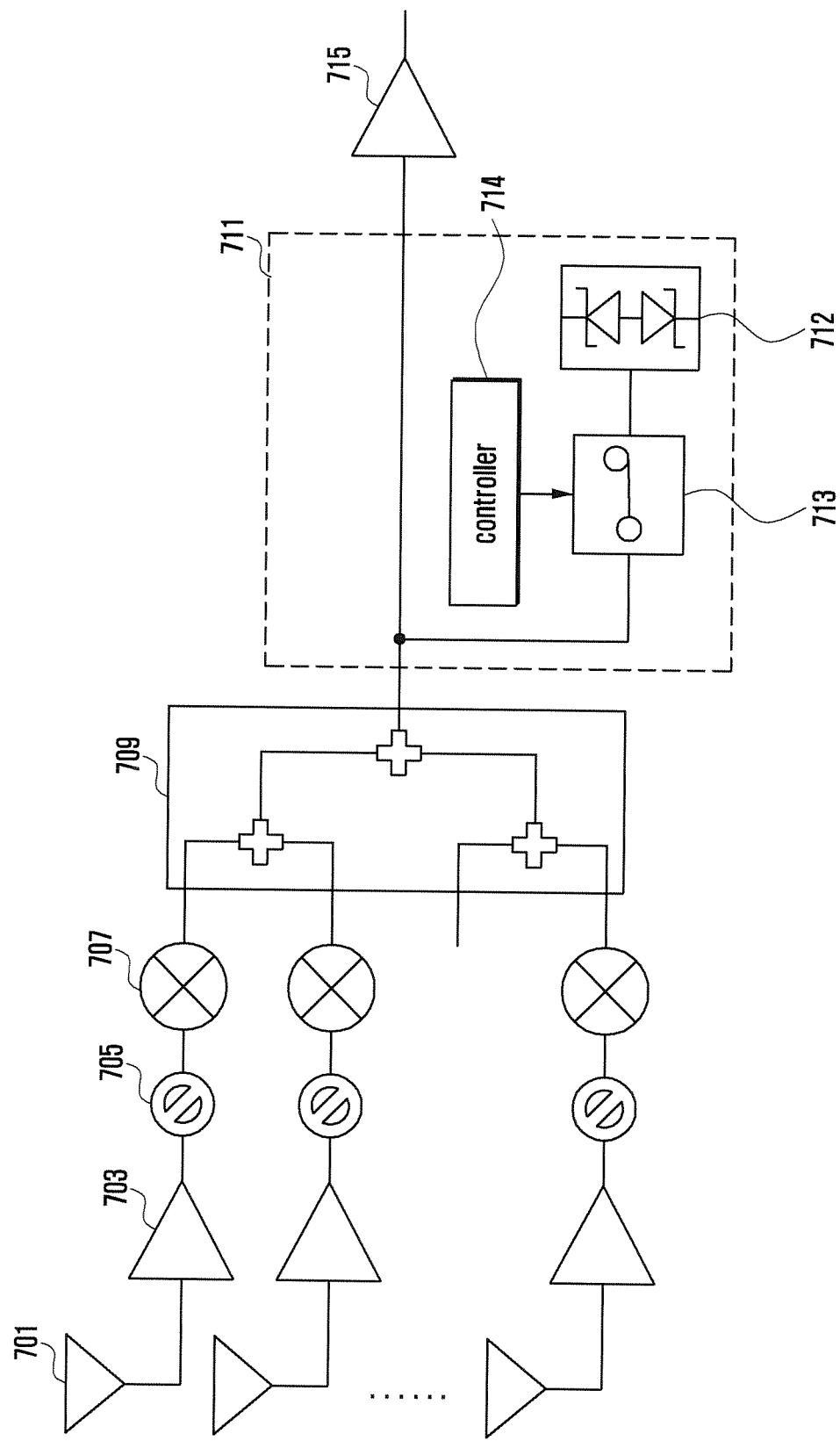
FIG. 7 is a circuit diagram illustrating a configuration of a receiver according to another embodiment of the present invention.

FIG. 7 is a circuit diagram illustrating a configuration of a receiver according to another embodiment of the present invention.

In reference to FIG. 7, the receiver of the present invention includes a plurality of antenna elements 701, a plurality of low-noise amplifiers 703, a plurality of phase shifters 705, a plurality of mixers 707, a combiner 709, a limiter 711, and an amplifier 715. Although FIG. 7 shows only the components necessary for explaining the present invention, the receiver may further include other components in charge of various functions.

The operations of the antenna elements 701, the low-noise amplifiers 703, the phase shifters 705, the mixers 707, and the combiner 709 are identical with those of FIG. 2; thus, detailed descriptions thereof are omitted herein.

The limiter 711 may include a limiter circuit 712, a switch 713, and a controller 714 for controlling them.

The limiter circuit 712 may cut off an upper or lower part of a waveform of the input signal to limit the amplitude. The limiter circuit 712 may be referred to as a limiter, a limiter circuit, or a slice circuit and typically implemented with a diode device, but the present invention is not limited by the device implementing the limiter circuit 712.

Unlike the embodiment of FIG. 2, the receiver of FIG. 7 may be implemented with one switch. However, the number of switches is not limited, and the limiter 711 may be designed in various ways according to the number of switches. The switch 713 may operate to provide connection or disconnection to the limiter circuit 712 under the control of the controller 714.

The controller 714 may control the switch 713 such that the signal output from the combiner 709 passes through or bypasses the limiter circuit 712. The controller 714 may control the switch 713 according to the frame scheduling of the received signal or the setting value of antenna gain. In various embodiments, the controller 714 may be a modem.

In various embodiments, the amplifier 715 may amplify the signal passed through the limiter with an arbitrary gain. It may also be possible to arrange a transceiver switch or an operation unit between the antenna elements 701 and the low-noise filters 703.

Figure 8:
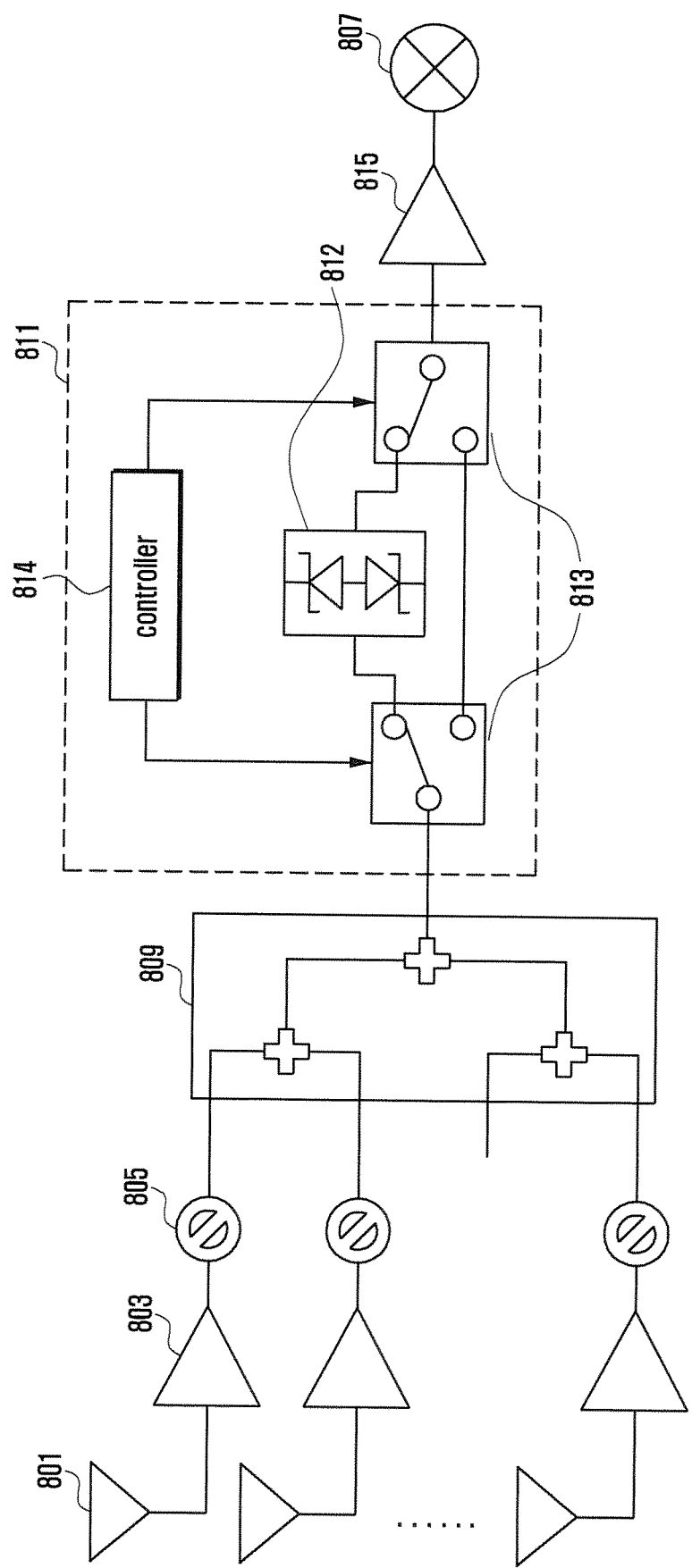
FIG. 8 is a circuit diagram illustrating a configuration of a receiver according to another embodiment of the present invention.

FIG. 8 is a circuit diagram illustrating a configuration of a receiver according to another embodiment of the present invention.

In reference to FIG. 8, the receiver of the present invention includes a plurality of antenna elements 801, a plurality of low-noise amplifiers 803, a plurality of phase shifters 805, a mixer 807, a combiner 809, a limiter 811, and an amplifier 815. Although FIG. 8 shows only the components necessary for explaining the present invention, the receiver may further include other components in charge of various functions.

The embodiment of FIG. 8 differs from the embodiment of FIG. 2 in that the mixer 807 is arranged at the end of the receiver circuit. However, the arrangement of the components may be changed in various embodiments. It may also be possible to arrange a transceiver switch or an operation unit between the antenna elements 801 and the low-noise amplifiers 803.

Figure 9:
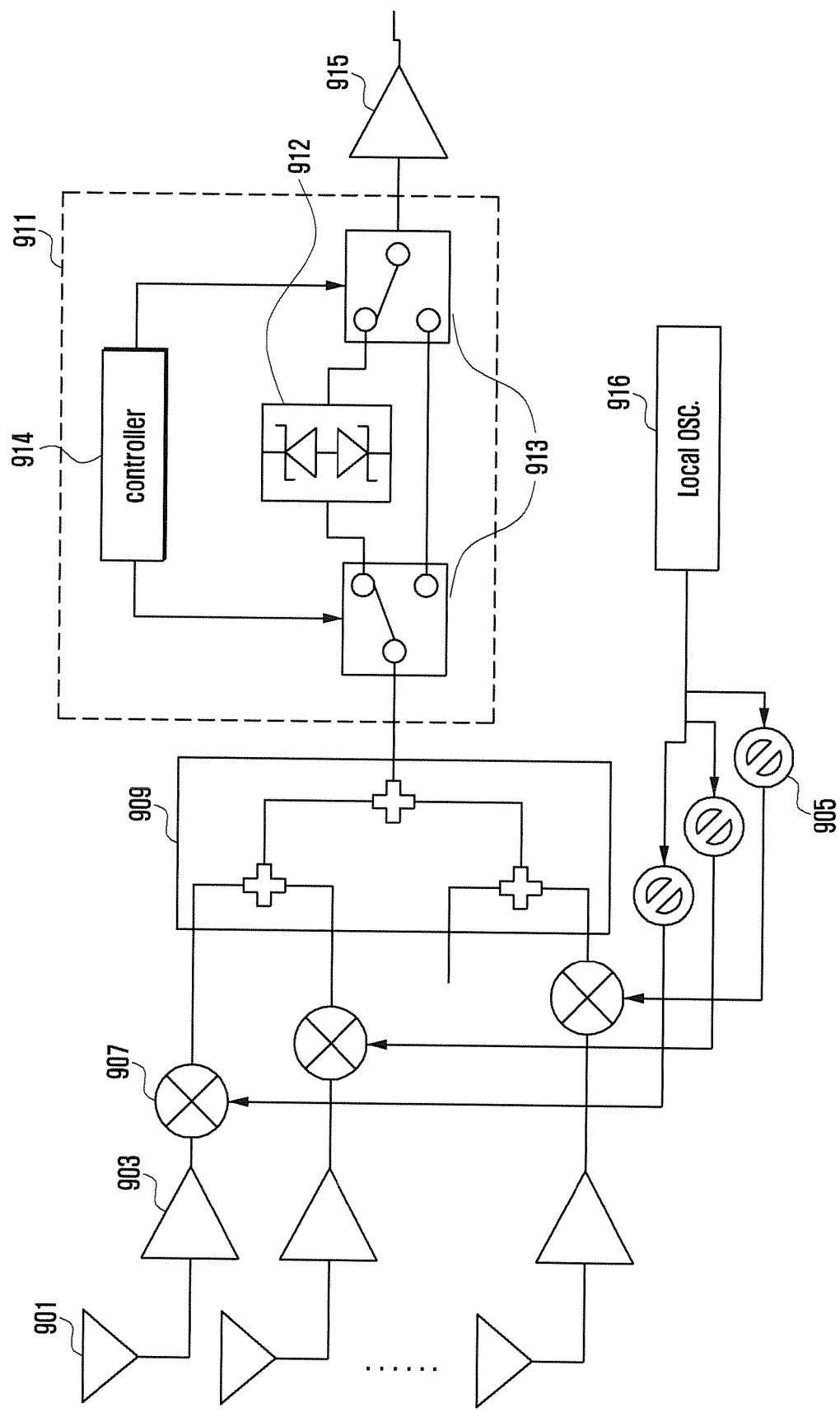
FIG. 9 is a circuit diagram illustrating a configuration of a receiver according to still another embodiment of the present invention.

FIG. 9 is a circuit diagram illustrating a configuration of a receiver according to still another embodiment of the present invention.

In FIG. 9, the positions of phase shifters 905 are changed. In the embodiment of FIG. 8, the signal output from the combiner 809 passes the limiter 811 to the mixer 807.

In the embodiment of FIG. 9, the phase shifters 905 are arranged in such a way of shifting phases of sine wave signals generated by a separately arranged oscillator 916; thus, the mixers 907 mix the shifted signals with the outputs of the low noise amplifies 903 to change the frequencies rather than inputting the signals received by the antenna elements to the phase shifters 905.

FIGS. 7 to 9 show embodiments modified from the embodiment of FIG. 2: the arrangements of the switches and the limiter circuits are changed in FIG. 7, the positions of the mixers are changed in FIG. 8, and the arrangements of the phase shifters are changed in FIG. 9.

In the embodiments of the present invention, every step may be selectively performed or omitted. In every embodiment, two successive steps may be performed substantially at the same time or in reverse order. The embodiments disclosed in the specification and drawings are proposed to help explain and understand the present invention rather than limit the scope of the present invention. It is obvious to those skilled in the art that various modifications and changes can be made thereto without departing from the spirit and scope of the present invention.

Although various embodiments of the present invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

INDUSTRIAL APPLICABILITY

The present invention relates to a signal reception method and apparatus for use in a mobile communication system and is applicable to all the types of industries related to a terminal supporting a beamforming technique.

The invention claimed is:

1. A signal reception method of a receiver supporting beamforming in a mobile communication system, the method comprising:
   configuring an operation of a limiter to one of an OFF state or an ON state based on at least one of whether an analog signal to be received is a data channel (DCH) signal, or whether a gain of an amplifier is equal to or less than a threshold value; and
   receiving the analog signal via the limiter based on the configuration.

2. The method of claim 1, wherein configuring the operation of the limiter comprises setting, in case that the analog signal to be received is the DCH and the gain of the amplifier is equal to or less than the threshold value, the operation of the limiter to OFF.

3. The method of claim 1, wherein configuring the operation of the limiter comprises setting, in case that the analog signal to be received is the DCH and the gain of the amplifier is greater than the threshold value, the operation of the limiter to ON.

4. The method of claim 1, wherein configuring the operation of the limiter comprises setting, in case that the analog signal to be received is not the DCH, the operation of the limiter to ON.

5. The method of claim 1, wherein configuring the operation of the limiter comprises setting, in case that the gain of the amplifier is greater than the threshold value, the operation of the limiter to ON.

6. The method of claim 1, wherein configuring the operation of the limiter comprises setting, in case that the gain of the amplifier is equal to or less than the threshold value, the operation of the limiter to OFF.

7. The method of claim 1, wherein configuring the operation of the limiter comprises setting, in case that the analog signal to be received is the DCH requiring a high Signal-to-Noise Ratio (SNR), the operation of the limiter to OFF.

8. The method of claim 1, wherein receiving the analog signal comprises:
   combining signals received through at least two antennas of the receiver; and
   processing the combined signal based on the configuration of the limiter.

9. A receiver supporting beamforming in a mobile communication system, the receiver comprising:
   at least two antennas for receiving an analog signal transmitted by a transmitter; and
   a controller that configures an operation of a limiter to one of an OFF state or an ON state based on at least one of whether the analog signal to be received is a data channel (DCH) signal, or whether a gain of an amplifier is equal to or less than a threshold value, and controls the receiver to receive the analog signal via the limiter based on the configuration.

10. The receiver of claim 9, wherein the controller sets, in case that the analog signal to be received is the DCH and the gain of the amplifier is equal to or less than the threshold value, the operation of the limiter to OFF.

11. The receiver of claim 9, wherein the controller sets, in case that the analog signal to be received is the DCH and the gain of the amplifier is greater than the threshold value, the operation of the limiter to ON.

12. The receiver of claim 9, wherein the controller sets, in case that the analog signal to be received is not the DCH, the operation of the limiter to ON.

13. The receiver of claim 9, wherein the controller sets, in case that the gain of the amplifier is greater than the threshold value, the operation of the limiter to ON.

14. The receiver of claim 9, wherein the controller sets, in case that the gain of the amplifier is equal to or less than the threshold value, the operation of the limiter to OFF.

15. The receiver of claim 9, wherein the controller sets, in case that the analog signal to be received is the DCH requiring a high Signal-to-Noise Ratio (SNR), the operation of the limiter to OFF.

16. The receiver of claim 9, wherein the controller combines signals received through at least two antennas of the receiver and processes the combined signal based on the configuration of the limiter.

17. A receiver supporting beamforming in a mobile communication system, the receiver comprises:
   at least two antennas for receiving signals transmitted by a transmitter;
   a combiner that combines the signals received through the at least two antennas; and
   a limiter that adjusts an amplitude of a combined signal output from the combiner,
   wherein an operation of the limiter is configured to one of an OFF state or an ON state based on at least one of whether the combined signal is a data channel (DCH) signal, or whether a gain of an amplifier is equal to or less than a threshold value.

18. The receiver of claim 17, wherein the limiter comprises:
   a first switch for outputting the combined signal to at least one of a limiter circuit or a second switch, the limiter circuit adjusting the amplitude of the combined signal and outputting the amplitude-adjusted signal to the second switch, and the second switch receiving and outputting one of outputs from the limiter circuit and the first switch; and
   a controller that controls the first and second switches based on at least one of a type of the signals to be received, or whether the gain of the amplifier is equal to or less than the threshold value.

19. The receiver of claim 17, wherein the limiter comprises:
   a third switch connected in series to an output node of the combiner;
   a limiter circuit that is connected in series to the third switch and adjusts an amplitude of an output signal of the third switch; and
   a controller that controls the third switch based on the signals to be received.

20. The receiver of claim 19, wherein the limiter further comprises a fourth switch connecting the limiter circuit and an output node of the limiter, and the controller controls a first and a second switch based on the signals to be received.

21. The receiver of claim 19, further comprising a mixer that is connected in series to an output node of the limiter and changes a frequency of an output signal of the limiter.

* * * * *